(12) United States Patent
Fazeldehkordi et al.

(10) Patent No.: US 9,325,544 B2
(45) Date of Patent: Apr. 26, 2016

(54) PACKET-LOSS CONCEALMENT FOR A DEGRADED FRAME USING REPLACEMENT DATA FROM A NON-DEGRADED FRAME

(71) Applicant: CSR Technology Inc., Sunnyvale, CA (US)

(72) Inventors: Amin Fazeldehkordi, Rochester Hills, MI (US); Rogerio G. Alves, Macomb Township, MI (US)

(73) Assignee: CSR TECHNOLOGY INC., Sunnyvale, CA (US)

( * ) Notice: Subject to any disclaimer, the term of this patent is extended or adjusted under 35 U.S.C. 154(b) by 240 days.

(21) Appl. No.: 13/664,700

(22) Filed: Oct. 31, 2012

(65) Prior Publication Data

US 2014/0119478 A1    May 1, 2014

(51) Int. Cl.
*H04L 25/49* (2006.01)
*G10L 19/005* (2013.01)

(52) U.S. Cl.
CPC .......... *H04L 25/4927* (2013.01); *G10L 19/005* (2013.01)

(58) Field of Classification Search
CPC .................... G10L 2019/00; G10L 2019/0012
See application file for complete search history.

(56) References Cited

U.S. PATENT DOCUMENTS

| | | | | |
|---|---|---|---|---|
| 6,003,001 A * | 12/1999 | Maeda | ............ | 704/223 |
| 6,073,092 A * | 6/2000 | Kwon | ............ | 704/219 |
| 2003/0133423 A1* | 7/2003 | LaDue | ............ | 370/330 |
| 2007/0225971 A1* | 9/2007 | Bessette | ........... | 704/203 |
| 2008/0046233 A1* | 2/2008 | Chen et al. | ......... | 704/211 |
| 2008/0046236 A1* | 2/2008 | Thyssen et al. | ....... | 704/228 |
| 2008/0046248 A1* | 2/2008 | Chen et al. | ......... | 704/262 |
| 2009/0204394 A1* | 8/2009 | Xu et al. | ............ | 704/205 |
| 2009/0240492 A1* | 9/2009 | Zopf et al. | ......... | 704/219 |
| 2010/0125454 A1 | 5/2010 | Zopf et al. | | |
| 2010/0281321 A1 | 11/2010 | Sun et al. | | |
| 2011/0196673 A1* | 8/2011 | Sharma et al. | ....... | 704/207 |

FOREIGN PATENT DOCUMENTS

| | | |
|---|---|---|
| EP | 1 589 330 A1 | 10/2005 |
| EP | 2 133 867 A1 | 12/2009 |
| WO | WO-2008/151408 A8 | 12/2008 |

OTHER PUBLICATIONS

A UK Search Report for Application No. GB1220995.3 searched on Apr. 8, 2014, 1 page.
Saramäki, T., "Part V. F: Cosine-Modulated Filter Banks," Lecture Notes, Tampere University of Technology, Institute of Signal Processing, Tampere, Finland, 2010, 15 pages.

(Continued)

*Primary Examiner* — Michael N Opsasnick
(74) *Attorney, Agent, or Firm* — The Marbury Law Group, PLLC

(57) ABSTRACT

A method of updating the state of a decoder that decodes a wide-band signal including a plurality of sub-band signals, including: receiving the plurality of sub-band signals; for each sub-band signal, storing portions of that sub-band signal in a respective buffer; responsive to determining that a portion of the wide-band signal is degraded, performing a packet loss concealment algorithm to determine wide-band replacement data for the degraded portion; selecting a portion of the sub-band signal stored in each buffer in dependence on the determined wide-band replacement data; and updating the state of the decoder using the selected portions.

15 Claims, 10 Drawing Sheets

(56) References Cited

OTHER PUBLICATIONS

Sun, X. et al., "Decoder State-Copying for Bluetooth CVSD Packet Loss Concealment," 12th International Workshop on Acoustic Echo and Noise Control, 2010, Tel Aviv, Israel, Aug. 30-Sep. 2, 2010, 4 pages.

Vaidyanathan, P. P., "Multirate Digital Filters, Filter Banks, Polyphase Networks, and Applications: A Tutorial," Proceedings of the IEEE, vol. 78, No. 1, Jan. 1990, pp. 56-93.

Wasem, O. J. et al., "The Effect of Waveform Substitution on the Quality of PCM Packet Communications," IEEE Transactions on Acoustics, Speech, and Signal Processing, vol. 36, No. 3, Mar. 1988, pp. 342-348.

\* cited by examiner

PACKET-LOSS CONCEALMENT FOR A DEGRADED FRAME USING REPLACEMENT DATA FROM A NON-DEGRADED FRAME

FIELD OF DISCLOSURE

This invention relates to enhancements of received signal quality when portions of an encoded data stream representing the signal have been degraded or lost.

BACKGROUND

In virtually all wireless communication systems, the data to be transmitted is encoded or modulated prior to transmission to a receiver device. If the data to be transmitted is an analogue signal, for example a voice signal, it is common to transmit the data representing the analogue signal as a digital signal. Broadly speaking, this is done by first sampling the analogue signal to produce a discrete representation of the signal. The rate at which the signal is sampled is termed the "sampling rate". The sampled signal could be encoded as digital data using, for example, Pulse Code Modulation (PCM). In PCM, each of the discrete values of the sampled signal are represented in binary. The binary values can then be transmitted over a communication network as a bit stream. The bit stream is often segmented into frames, and each frame can contain information relating to, for example, the transmitter or information to be used by the receiving device so it can correctly process the transmitted data. Some networks may transmit data in packets, where each packet may contain several frames.

Typically, in a communication network a coder will encode the data into a bit stream and a decoder will decode the received bit stream into an output signal. The combination of a coder and decoder is known as a codec. A key problem in wireless communication networks is adverse connection conditions which can result in a received frame or packet containing bit errors. This can result in the packet being considered to be in a damaged state or lost. The difference between a packet being considered damaged or lost can arise from the position of the bit error within the packet. If the bit error is within the packet header it can lead to the whole packet being rejected, which is termed packet loss. Alternatively, if the bit error is within the payload of the packet, the packet could be considered as damaged. Generally, the techniques used to improve the received data quality in the event of a damaged packet or packet loss can be divided into two groups: transmitter-side recovery techniques and receiver-side recovery techniques. Transmitter-side recovery techniques include, for example: retransmission of a degraded packet; interleaving the content of several packets or the addition of error correction coding bits to the data packets to be transmitted, which is known as forward error correction coding (FEC). Transmission-side recovery techniques often suffer from the problem of increased bandwidth and delays to the transmission of the data. For this reason, transmission-side recovery techniques are typically limited to applications where the expected packet loss/damage rate is low. Furthermore, transmitter-side recovery techniques often require greater computational complexity, meaning that certain transmitters are not suitable for its implementation.

Receiver-side recovery techniques are known as packet loss concealment (PLC) techniques. PLC techniques work by generating replacement data to cover data missing from a received bit stream. PLC is often applied when the data transmitted over the network is speech data. Some PLC techniques can be of relatively low complexity, for example the receiver can replace the damaged packet with data corresponding to silence, a technique known as muting. Another technique is to replace the lost packet with a replica of a previously received packet. However, both of these techniques can lead to a poor quality output signal. More complex techniques include model based concealment methods, in which the speech signal either side of the lost packet is modelled in order to generate data corresponding to the speech signal for the lost packet. Model based techniques can result in a high quality output signal, however they can be highly complex and expensive to implement.

In practice, PLC techniques are often based on interpolation, in which data for the replacement packet is generated by interpolating parameters on one or both sides of the lost packet. Interpolation techniques are popular due to their relative simplicity and ability to generate reasonably high quality output signals. One example of an interpolation based technique is known as "pitch-based waveform substitution", in which the pitch period of the damaged or lost packet is estimated using a buffer of previously decoded signal. A segment of buffered signal is then selected that is one or multiple pitch periods apart from the damaged or lost signal. This selected segment of signal is output as the replacement signal. Pitch-based waveform substitution is particularly effective when the signal to be transmitted is a voice signal, due to the quasi-periodic nature of such signals.

FIG. 1 is a schematic diagram of a receiver 100 implementing pitch-based waveform substitution. A received signal $S_o$ representing received encoded data is input into a decoder 101 and a Bad-Frame Indicator (BFI) module 102. The BFI module determines whether the received encoded data contains any corrupted frames, where a corrupted frame could include both damaged frames and lost frames. If it is determined that a frame is not corrupted, a switch 103 is connected such that the signal representing the data in that frame is output as the output signal $\hat{S}_o$. A pitch measurement module 104 estimates the pitch period of the output signal representing that frame and inputs samples of that signal into a buffer 105. If the BFI determines that a frame is corrupted, the switch is configured such that the output signal is output from the buffer rather than the decoder. The pitch period of the corrupted frame is estimated from the buffered decoded signals and pitch periods. The pitch period is then used to select a segment of decoded data from the buffer that can be output as a replacement signal for the corrupted frame.

Pitch based waveform substitution as described with reference to FIG. 1 can be an effective PLC method when the decoder does not require a memory to decode the received data. Unfortunately, it is not so effective at addressing the problem of PLC when the decoder operates to decode received data in dependence on an internal state held by the decoder. Examples of coding schemes in which the decoder operates in dependence on an internal state are: Continuously Variable Slope Delta (CVSD); Sub-band Coding (SBC) and Adaptive Delta Pulse Code Modulation (ADPCM). In these coding schemes, if the internal state of the decoder is not updated following the receipt of a degraded frame, then the decoder will be left in an internal state corresponding to the degraded frame. This internal state is often not the ideal internal state for the decoder to correctly decode the next received frame. This can result in the decoder incorrectly decoding the next received frame even if this frame is not degraded, which can have the effect of increasing the effective length of the frame loss to be greater than the length of the lost frame itself. There is therefore a need to compensate for the effect of the decoder holding an incorrect internal state following the receipt of a degraded frame.

US 2010/0125454 (Zopf) describes a system in which a signal corresponding to a replacement frame is re-encoded and used to update the state of the decoder following receipt of a lost frame. In more detail, a PLC module generates a decoded signal corresponding to a replacement frame. This signal is input into an analysis filter bank to re-encode the signal. This re-encoded signal is then passed through the decoder to generate a decoded output signal. Passing the re-encoded signal corresponding to the replacement frame through the decoder updates the state of the decoder such that the decoder is no longer in a state corresponding to the lost frame (see FIGS. 11 & 12; paragraphs 72 to 81). However, re-encoding a decoded signal and passing this re-encoded signal through the decoder introduces delays to the receiver system and requires additional processing power. There is thus a need for an improved method of updating the state of a decoder during PLC.

SUMMARY OF INVENTION

According to one aspect of the present invention, there is provided a method of updating the state of a decoder that a wide-band signal comprising a plurality of sub-band signals, comprising: receiving the plurality of sub-band signals; for each sub-band signal, storing portions of that sub-band signal in a respective buffer; responsive to determining that a portion of the wide-band signal is degraded, performing a packet loss concealment algorithm to determine wide-band replacement data for the degraded portion; selecting a portion of the sub-band signal stored in each buffer in dependence on the determined wide-band replacement data; and updating the state of the decoder using the selected portions.

The decoder could comprise a synthesis filterbank. the synthesis filterbank comprises a plurality of buffers equal to the number of sub-band signals.

Suitably, the method further comprises updating the state of the decoder using the selected portions by inputting the selected portion from each buffer into the respective buffer of the synthesis filterbank.

Suitably the method further comprises the steps of responsive to determining that a portion of the wide-band signal is not degraded, inputting the received sub-band signals corresponding to that portion into the synthesis filter bank to generate a wide-band signal.

The generated wide-band signal could be stored in a wide-band buffer. A signal could be outputted to replace the degraded portion of the wide-band signal from the determined wide-band replacement data.

The wide-band replacement data could be determined from wide-band signals stored in the wide-band buffer.

The packet loss concealment algorithm could determine the wide-band replacement data for the degraded portion by pitch-based waveform substitution. The packet loss concealment algorithm could determine the pitch period of the degraded portion of the wide-band signal.

The pitch period of the degraded portion of the wide-band signal could be used to determine the pitch period of the degraded portion for each sub-band signal.

A portion of the sub-band signal stored in each buffer could be selected in dependence on the pitch period of the degraded portion for the respective sub-band signal. Suitably the pitch period of the degraded portion for each sub-band signal is determined by a pitch index conversion module.

A portion of the wide-band signal could be a frame. A portion of the wide-band signal could be a packet.

The decoder could decode a wide-band signal that has been encoded by sub-band coding (SBC). Suitably the number of sub-band signals could be equal to 8. Suitably the number of sub-band signals could be equal to 4.

According to a second aspect of the present invention there is provided a method of performing packet-loss concealment in a digital communication, comprising: receiving data in a data stream; identifying a degraded portion in the received data, a degraded portion being concatenated on one side by a first non-degraded portion and concatenated on its other side by a second non-degraded portion; and responsive to identifying the degraded portion, performing a packet loss concealment algorithm to generate data to replace the degraded portion and a sub-portion of one of the first and second non-degraded portions.

The packet loss concealment algorithm could generate replacement data using pitch-based waveform substitution.

Suitably, the method further comprises the steps of: identifying a non-degraded portion in the received data; determining that the non-degraded portion is not concatenated with a degraded portion; decoding the received portion of data at a decoding device to produce decoded data, the values of the decoded data being dependent upon the received portion of data and an internal state held by the decoding device, the internal state of the decoding device being dependent upon previously received portions of data.

Suitably the method further comprises the steps of: responsive to determining that a non-degraded received portion is concatenated with a prior received degraded portion, decoding the remaining sub-portion of the non-degraded portion at a decoding device to produce decoded data, the sub-portion being chosen such that the decoder state held by the decoder during the decoding of the sub remaining portion is not dependent upon the degraded portion or a portion received prior to the degraded portion.

Suitably a portion of data could be a frame of data. Suitably a portion of data could be a packet of data Suitably a portion of data could comprise a plurality of samples, and a damaged portion could comprise at least one degraded sample.

The packet loss concealment could be performed on received data that has been encoded by sub-band coding (SBC).

The data generated by the PLC algorithm could be overlap added (OLA) to data decoded at the decoding device.

Suitably the method further comprises performing a packet loss concealment algorithm to generate data from previous portions of the received data to replace the degraded portion.

FIGURES

The present disclosure will be described by way of reference to the following drawings. In the drawings.

DETAILED DESCRIPTION

Figure 1:
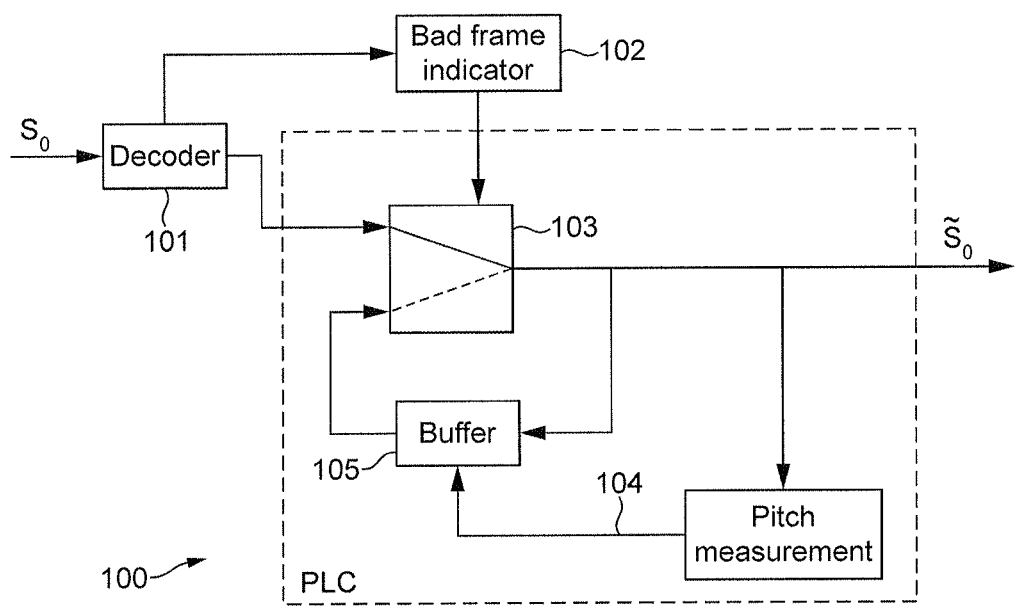
FIG. 1 is a schematic diagram of a receiver implementing pitch based waveform substitution.

The following description describes an improved method of packet loss concealment (PLC) in codec systems. In particular, the state of the decoder can be updated without re-encoding previously de-coded data.

In communication systems, transmitted frames or packets can be damaged or lost. This is known as either frame erasure or packet loss depending on the communication system being used. Special algorithms can be performed to conceal the degradation to the transmitted signal caused by the damage to, or loss of, these frames or packets. These algorithms are known as either frame erasure concealment (FEC) or packet loss concealment (PLC) depending on the communication system in which it is used. Since the terms FEC and PLC generally refer to the same kinds of technique, the term PLC will be used throughout this description to suitably refer to either term. The following description refers to processing frames of data, however the description equally applies to processing packets or any other suitable portions of data.

In certain codec systems, the decoder operates to decode received encoded data in dependence upon an internal state held by the decoder. If the decoder decodes a data stream containing a damaged or lost frame, the decoder will hold an internal state corresponding to that degraded frame. The term "degraded" is used in the following description to include both damaged frames and lost frames, where the distinction between the two typically arises from the location of the bit error within the frame. If the bit error is located within the header of the frame it can lead to the whole frame being rejected which results in a lost frame. If the bit error is located within the payload of the frame, the frame could be considered as damaged If the decoder does not decode the degraded frame then the decoder will hold an internal state corresponding to the frame received before the degraded frame. In either case, the decoder will be left holding an incorrect internal state. This will limit the ability of the decoder to correctly decode the next frame of received data, even if this frame is not degraded. This has the effect of increasing the effective length of the degraded frame beyond the length of the degraded frame itself.

The PLC systems and methods will be described with reference to sub-band codec (SBC) systems for the purposes of illustration. However, the systems and methods described herein are equally applicable to other codec systems, such as, for example, Continuously Variable Slope Delta (CVSD) and Adaptive Delta Pulse Code Modulation (ADPCM). The systems and methods described are generally applicable to any codec where the decoder operates to decode the encoded sub-band signals in dependence on an internal state held by that decoder. The term "wide-band" is used not to place a limitation on the bandwidth of a particular signal but to denote that the signal contains frequency components across its bandwidth and has not been decomposed into frequency sub-bands.

Figure 2:
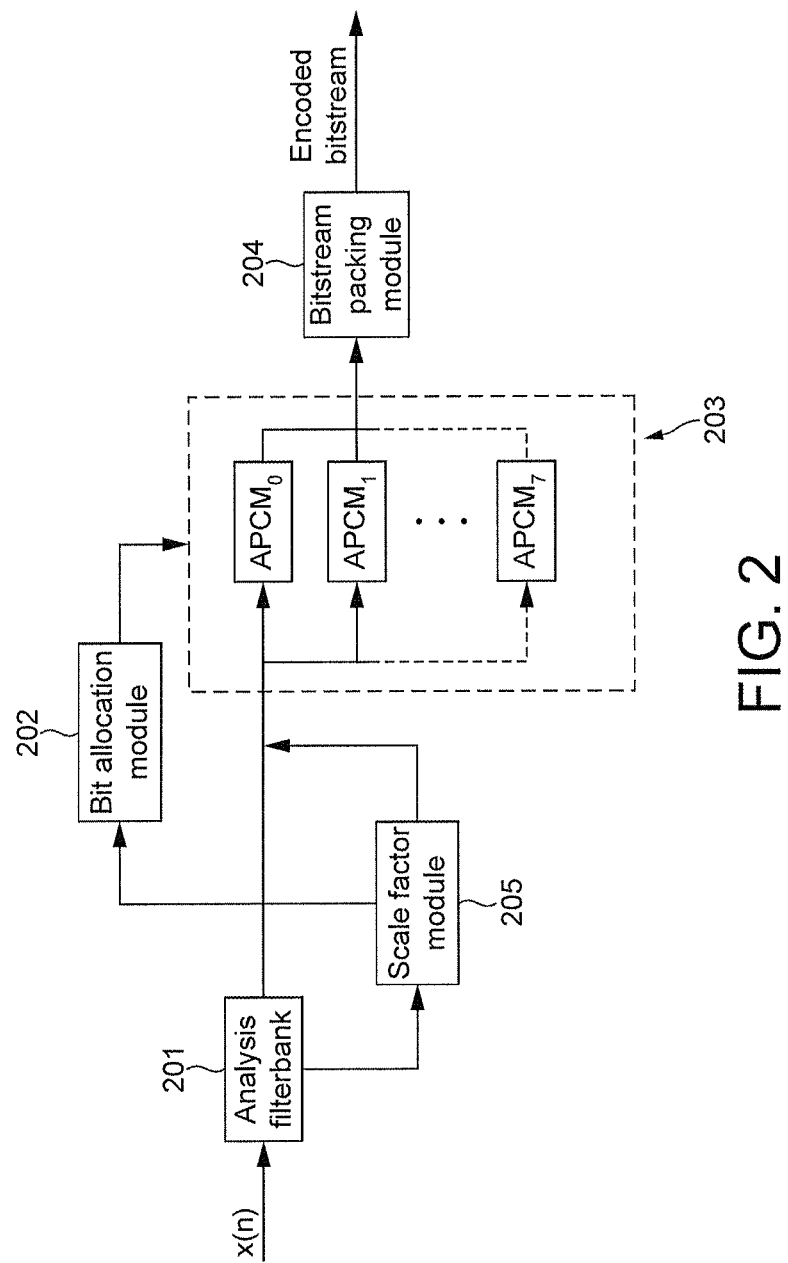
FIG. 2 is a schematic diagram of an exemplary encoder used in a sub-band codec.

FIG. 2 shows a schematic diagram of an example encoder used in a SBC. The encoder comprises an analysis filter bank 201, a bit allocation module 202, a plurality of quantizers $203_M$, a bitstream packing module 204 and a scale factor module 205. The analysis filter bank (AFB) is configured to receive input samples. The input samples are samples of the original signal to be transmitted, for example an audio signal. The input samples are denoted by x(n), where n denotes the discrete time of the sample. A frame will comprise a certain integer number of samples, and the sampled audio signal will consist of an integer number of frames. The AFB acts to decompose the audio signal into a set of sub-bands. In SBC systems, the number of sub-bands is either four or eight. The following description will be made with reference to a sub-band codec system with 8 sub-bands. This is again for illustrative purposes only, and the following disclosure is equally applicable to SBC systems with four sub-bands or indeed to other codec systems altogether. Each sub-band sample generated by the AFB is denoted by $S_M(m)$, where M=0, 1 ... 7 denotes the sub-band. The generated sub-band samples for each frame are input into a scale factor module 205. The scale factor module determines a scale factor for each sub-band. One way of calculating the scale factor for each sub-band is to take the maximum value of any sample within that sub-band. The scale factors are used by the bit-allocation module to calculate the number of bits to be allocated to each sub-band. The bit allocation module generally uses two methods for determining the number of bits to be allocated to each sub-band. The first method is known as the signal-to-noise (SNR) method. In the SNR method the number of bits, $N_b$ to be allocated to each sub-band is given by the following equation:

$$N_b = \log_2(\text{scalefactor}) - 1 \qquad (1)$$

The second method is known as the LOUDNESS method. In the LOUDNESS method the number of bits is calculated in a similar manner to the SNR method but with the additional use of a weighting factor that takes into account the position of the sub-bands and the sampling rate. In the example of the Bluetooth profile A2DP, standard tables are used to calculate the specific number of bits to be allocated to each sub-band in dependence on the scale factor. These tables can be found in the "Advanced Audio Distribution Profile (A2DP) Specification, Version 12, 2007" which is incorporated by reference herein. In general, both the SNR and LOUDNESS method allocate more bits to lower-frequency sub-bands with larger scale factors.

The quantizers $203_M$ receive the set of sub-band samples $S_M(m)$, the scale factors for each sub-band and the bit allocations for each sub-band. That is, for example, quantizer $203_1$ receives the samples $S_1(m)$ from the first sub-band, the scale factor for the first sub-band and the number of bits to be allocated to the first sub-band. The quantizers quantize the scale factors and normalise the sub-band samples by the quantized scale factor. The bitstream packing module creates packets for the quantized scale factors and quantized sub-band samples that are suitable for transmission over a communication network.

Figure 3:
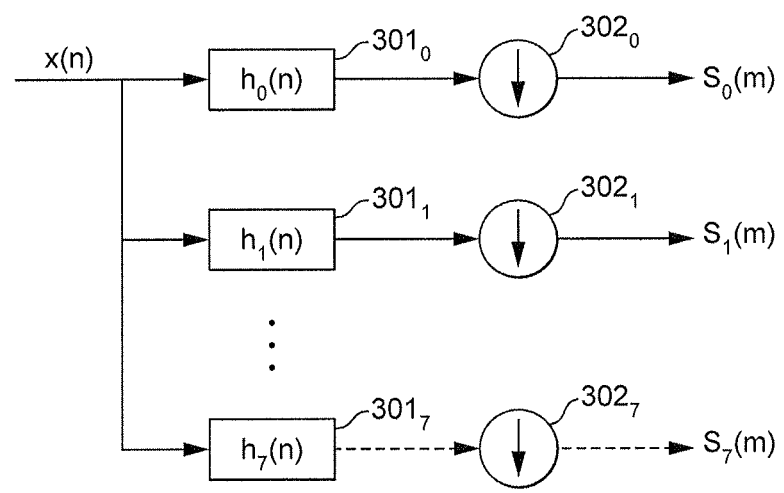
FIG. 3 is a schematic diagram of an exemplary analysis filter bank for use within an encoder.

The function of the AFB is to receive samples x(n) of the signal to be transmitted and decompose the samples into sub-bands. A schematic diagram of an example AFB is shown in FIG. 3. The AFB comprises a filter bank $301_M$ and a set of downsamplers $302_M$, where M=0, 1, ... 7. The samples x(n) are input into each filter. The output of the filter is input into a downsampler which generates the sub-band samples $S_M(m)$. Suitably, the set of filters $h_M(n)$ is derived from a single filter known as a prototype filter. This allows for an efficient production of filters compared to having to design each filter separately. Suitably, the set of filters for use in the filter bank is generated from the prototype filter by way of a cosine modulation. With cosine modulation, each filter $h_M(n)$ is generated from a prototype filter p(n) according to the following equation:

$$h_M(n) = p(n)\cos\left(\left(M + \frac{1}{2}\right)\left(n - \frac{N}{2}\right)\frac{\pi}{N}\right) \quad (2)$$

In equation 2, N is the number of sub-bands, which as discussed is suitably four or eight, M=0, 1, ... N−1 and n=0, 1, ... 10N−1. The length of the filter is thus equal to ten times the number of sub-bands, which for eight sub-bands means the filter length is 80 samples. The form of the prototype filter will vary depending on the coding system used. For example, suitable values for the prototype filter for use in SBC in the Bluetooth profile A2DP can be found in the A2DP specification.

The output from each of the filters $301_M$ is input into a respective downsampler $302_M$. Suitably, the downsampler reduces the number of samples within a particular block of samples by a factor equal to the number of sub-bands. As an example, consider that the sampled signal x(n) is partitioned into frames of 7.5 ms duration at a sampling rate of 16 kHz. Each frame would thus contain 120 samples, or 15 blocks of 8 samples. If the AFB acts to decompose the input samples into 8 sub-bands, each downsampler $308_M$ would downsample the samples by a factor of 8. That is, for every block of 8 samples of the sampled signal x(n), the AFB outputs a single sample for each sub-band, denoted by $S_M(m)$. Therefore, each wide-band frame of 120 samples is decomposed into 8 sub-band frames each containing 15 samples. This is the principle of sub-band coding; by decomposing the wide-band signal x(n) into sub-bands and allocating different numbers of bits to different sub-bands, the data rate to transmit the original signal can be compressed compared to transmitting the signal as a wide-band signal.

Figure 4:
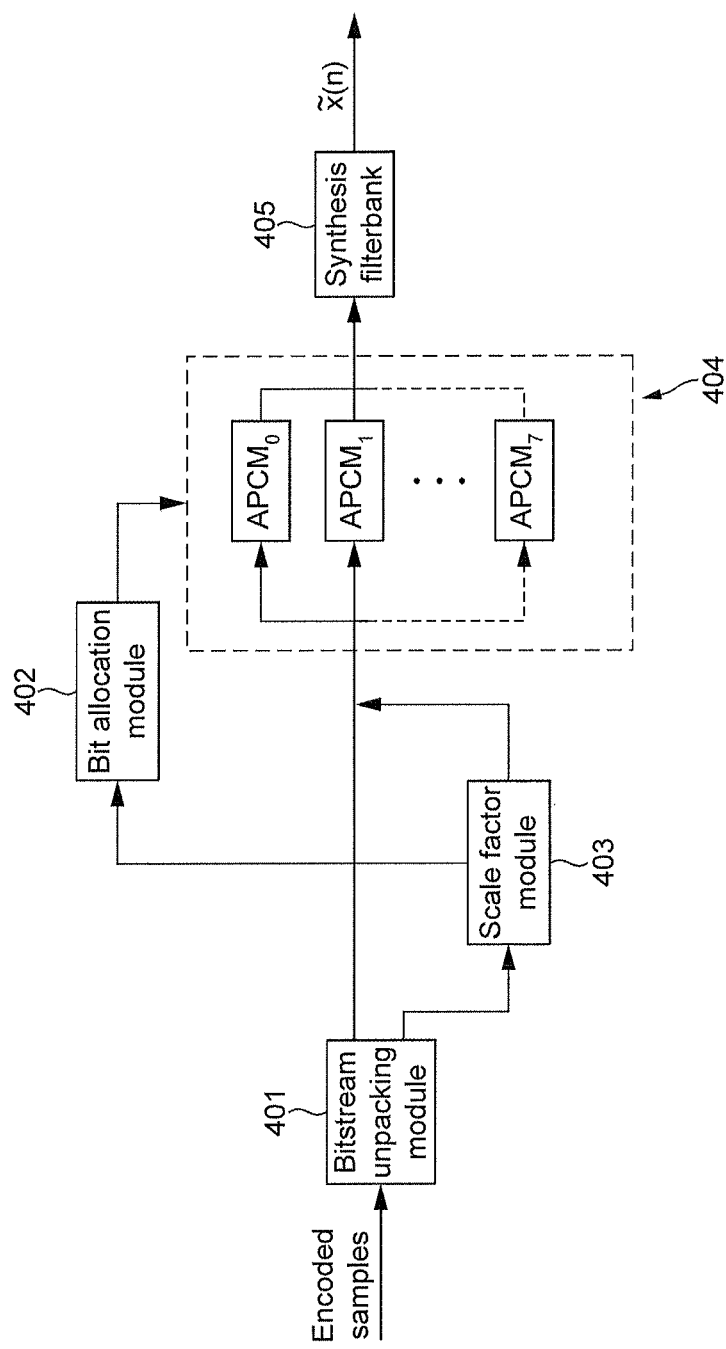
FIG. 4 is a schematic diagram of an exemplary decoder used within a sub-band codec.

Once the sampled signal x(n) has been encoded into a bitstream and transmitted, a receiver device will receive the encoded data and act to decode it, with the aim of reproducing the original sampled signal x(n). FIG. 4 shows a block diagram of an exemplary decoder for use within a sub-band codec. The decoder comprises a bitstream unpacking module 401, a bit allocation module 402, a scale factor module 403, a set of de-quantizers $404_M$ and a synthesis filter bank (SFB) 405. The bitstream unpacking module receives a transmitted encoded bitstream corresponding to a frame of the sampled signal x(n), and extracts from it the bits corresponding to the quantized scale factors and quantized sub-band samples. The scale factor module 403 receives the quantized scale factors from the bitstream unpacking module 401 and de-quantizes the quantized scale factors to produce scale factors for each sub-band. The scale factors are output from the scale factor module into the bit allocation module which determines the number of bits allocated to each scale factor. The bitstream unpacking module also extracts the bits corresponding to the quantized sub-band samples. The quantized sub-band samples, quantized scale factors and bit allocations are input into the set of de-quantizers $404_M$. The set of de-quantizers produces a set of de-quantized sub-band samples for each sub-band, and inputs the generated sets of de-quantized sub-band signals into the synthesis filter bank (SFB). The SFB operates in an inverse manner to the AFB in the encoder: it receives a set of samples from each sub-band and outputs a wide-band set of samples representative of a frame of the original sampled signal x(n).

Figure 5:
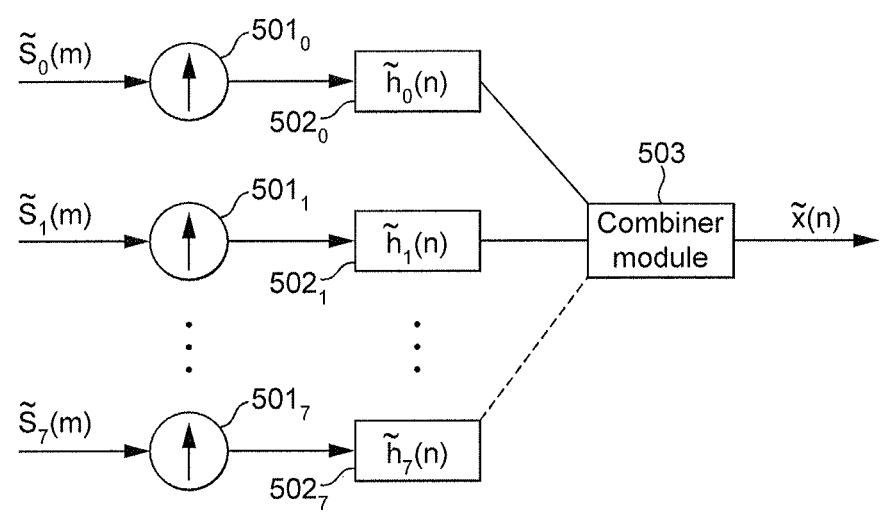
FIG. 5 is a schematic diagram of an exemplary synthesis filter bank for use within a decoder.

FIG. 5 is a schematic diagram of an example SFB. The SFB comprises a set of upsamplers $501_M$, a set of filters $502_M$ and a combiner module 503. The set of de-quantized received sub-band samples $\tilde{S}_M(m)$ are input into respective upsamplers $501_M$, where M=0, 1, ... 7 if there are 8 sub-bands. The upsamplers act inversely to the downsamplers of the encoder: for every sub-band sample input into an upsampler, the upsampler will generate a block of 8 samples. Therefore if a frame of 120 samples had been decomposed into eight sets of sub-band samples with each set containing 15 samples, and each set of sub-band samples was input into a respective upsampler, each upsampler would output a block of 120 samples, the same number of samples as in the original frame. Each block of samples output from an upsampler is input into a synthesis filter $\tilde{h}_M(n)$. Each filter in the synthesis filter bank may be derived from a prototype filter in an analogous way to the filters in the analysis filter bank. For decoders for use in SBC systems, the filters may be generated from a prototype by way of cosine modulation. Filters for use in the synthesis filter bank can be generated from a prototype filter p(n) by way of cosine modulation in accordance with the following equation:

$$\tilde{h}_M(n) = p(n)\cos\left(\left(M + \frac{1}{2}\right)\left(n + \frac{N}{2}\right)\frac{\pi}{M}\right) \quad (3)$$

Similarly to the case for the encoder, N is the number of sub-bands (which is suitably either 4 or 8), M=0, 1, ... N−1 and n=0, 1, ... 10N−1. The output from each of the synthesis filters $502_M$ is input into a combiner module 503. The combiner module combines the set of filtered samples from each sub-band into a wide-band set of decoded samples representative of the transmitted frame of the original sampled signal. This wide-band set of decoded sampled points is denoted by $\tilde{x}(n)$ to distinguish it from the original set of sampled points x(n) that were transmitted. If the transmission has been carried out with zero error then $\tilde{x}(n)=x(n)$.

The synthesis filter contains memory that needs to be updated following receipt of a degraded frame. Suitably, in mSBC systems, the filter has a length equal to ten times the number of sub-bands. So, for an exemplary system containing 8 sub-bands, the filter has a length equal to 80 samples. With an exemplary sampling rate of 16 kHz, this corresponds to a time of 5 ms. Suitably, each sub-band in the synthesis filter has a 10 sample buffer that accounts for 5 ms of samples at a 2 kHz sampling rate (the sampling rate in the sub-band is reduced by a factor M equal to the number of sub-bands compared to the sampling rate in the wide-band. This is because a block of M samples in the wide-band is reduced to 1 sample in the sub-band, i.e., the number of samples is reduced by a factor M and so the sample rate is reduced accordingly).

Figure 6A:
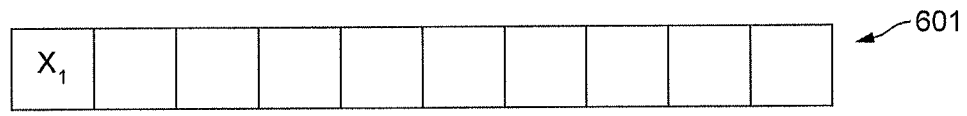
FIG. 6A is a schematic diagram of a synthesis filter sample buffer during the decoding process of a degraded frame.
Figure 6B:
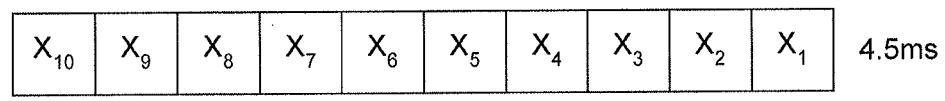
FIG. 6B is a schematic diagram of a synthesis filter sample buffer 4.5 ms into the decoding process of a degraded frame.
Figure 6C:
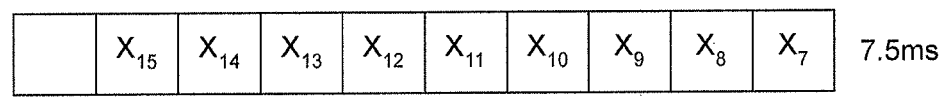
FIG. 6C is a schematic diagram of a synthesis filter sample buffer 4.5 ms into the decoding process of a degraded frame.

An exemplary wide-band frame of 120 samples is decomposed into 8 sub-band frames with each sub-band frame comprising 15 samples. With a sampling rate of 16 kHz and 120 samples, each frame will be a duration of 7.5 ms. During the decoding process, a sample is input into each sub-band sample buffer one sample at a time for the duration of the frame. This process will be described by way of example with reference to FIGS. 6A, 6B and 6C. FIG. 6A is a schematic diagram of a 10 sample synthesis filter buffer 601. If a degraded frame is input into the synthesis filterbank, each synthesis filter buffer will contain one sample corresponding to the degraded frame at the beginning of the decoding process for the degraded frame. The samples corresponding to the degraded frame are denoted by an 'x'. The samples move through the buffer every 0.5 ms (½₀₀₀ kHz). A schematic diagram of a filter buffer at a time of 4.5 ms after the start of the decoding operation is shown in FIG. 6B and after a time of 7.5 ms in FIG. 6C. Thus after a time equal to the duration of the frame, the last sample corresponding to the degraded frame will require another 4.5 ms before it is flushed out of the sub-band synthesis filter buffer. At the wide-band sampling rate of 16 kHz this corresponds to 72 samples. Therefore, it is possible for the receipt of a degraded frame to adversely affect the quality of 72 samples in the next received frame, even if this frame is not itself degraded. This increases the length of the degraded frame to 192 samples, or 12 ms.

Figure 7:
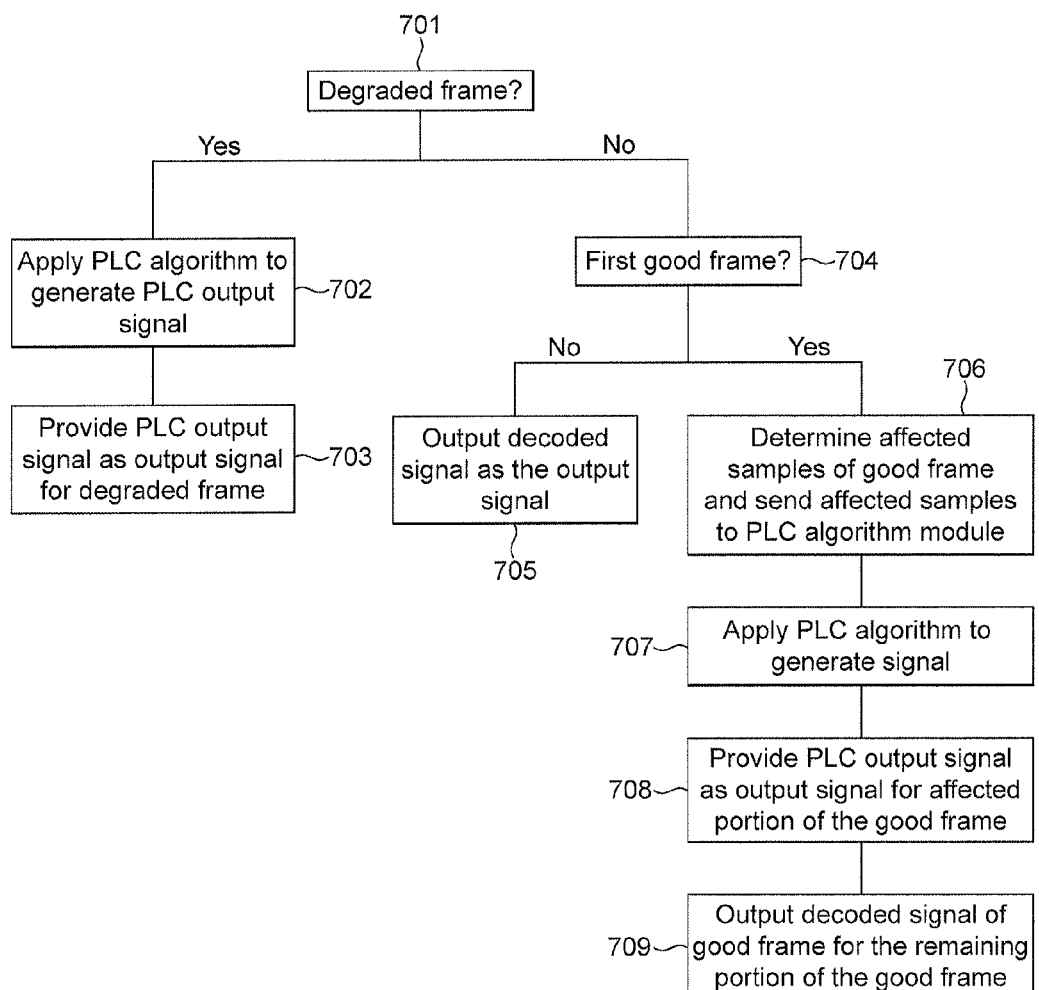
FIG. 7 is a flow chart illustrating a method of PLC.

It is possible to account for the effect of the decoder being in the incorrect internal state following the receipt of a degraded frame without having to provide specific means for updating the state of the decoder. An example of a method that can be used to achieve this effect is shown in FIG. 7. At step 701, it is determined whether the received frame is a degraded frame. The determination of whether a frame is degraded could be done by, for example, a cyclic redundancy code. Alternatively, an estimate of the signal to noise ratio for the received signal could be used to detect a bad frame. If it is determined that the received frame is degraded, a PLC module generates a PLC signal at step 702. At step 703 the PLC module outputs the PLC signal corresponding to a replacement frame for the degraded frame. The PLC module may use any PLC technique or algorithm in order to generate a replacement frame. For example, the PLC module may utilise waveform substitution, muting or frame replication in order to generate the replacement frame. Alternatively, the PLC module may generate a signal corresponding to the replacement frame in dependence upon an algorithm, for example the algorithms described in US patent application 2010/0281321, which is incorporated by reference herein. The method disclosed is not limited by the operation of the PLC module.

If it is determined that the received frame is not a degraded frame, it is determined at step 704 whether the frame is the first non-degraded frame following a degraded frame. If the frame is not the first non-degraded frame, then the decoded signal corresponding to that frame is output as the output signal at step 705. If the frame is the first non-degraded frame after a degraded frame, the portion of the frame adversely affected by the internal state of the decoder is found and input into the PLC module at step 706. As an illustration, consider the situation where each frame is of 7.5 ms duration at a sampling rate of 16 kHz, meaning each frame contains 120 samples. If, for example, a sub-band codec system is used with 8 sub-bands, then the internal state of the decoder following a degraded frame can affect up to 72 samples of the next frame, as described above. With this example configuration and codec, at step 706 the 72 affected samples would be determined and sent to the PLC module. Although the state of the decoder affects up to 72 samples, one exemplary approach is to select the first 72 samples of the first non-degraded frame received following a degraded frame and send these samples to the PLC module. That is, it is not determined if all 72 samples are affected. This approach has the advantage of being computationally efficient because the affected samples do not need to be determined. Furthermore, by selecting the number of samples to be sent to the PLC module to be equal to the maximum number of potentially affected samples, it is ensured that all affected samples are sent to the PLC module.

At step 707 the PLC module generates a replacement portion for the affected sub-portion of the frame. The PLC module may generate a replacement portion using any known technique or algorithm. A signal corresponding to this replacement portion is output at step 708. The decoded signal corresponding to the remaining, unaffected sub-portion of the frame is output from the decoder at step 709. That is, the first non-degraded frame consists of the sub-portion of the frame output from the PLC module and the remaining sub-portion of the frame output from the decoder.

Figure 8:
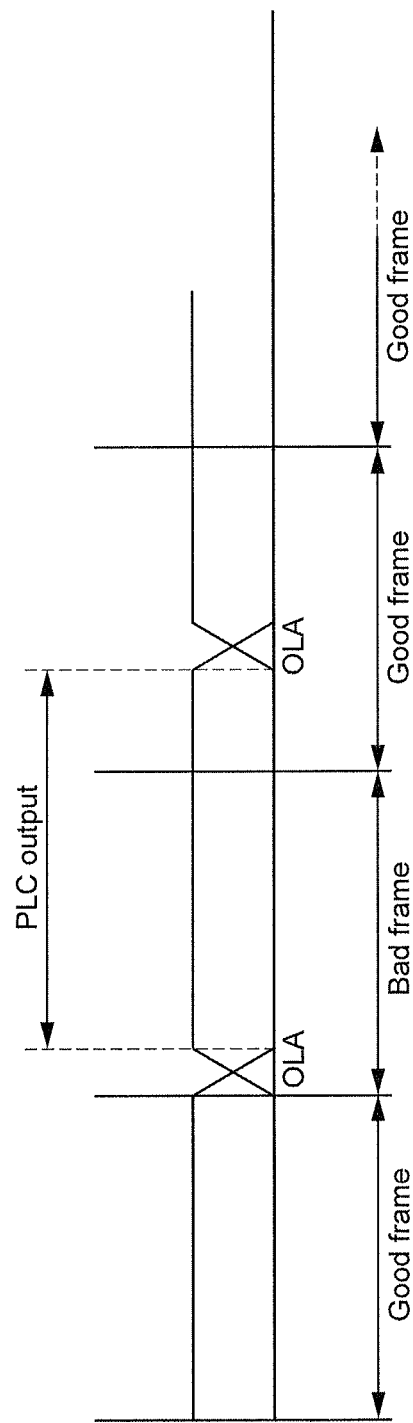
FIG. 8 is a schematic diagram of the output signals from a decoder and PLC module according to the method shown in FIGS. 6A-C.

In this method, the PLC module is used to generate a replacement frame for the degraded frame and a replacement portion of a frame for the affected portion of the next non-degraded frame. Outputting the signal from PLC module for the affected portion of the non-degraded frame allows the internal state held by the decoder to converge to the correct state. That is, rather than update the state of the decoder following the receipt of a degraded frame, the PLC module is used to generate an output signal for the duration of the time that the decoder holds internal states corresponding to the degraded frame. The portion of the non-degraded frame affected by the internal state of the decoder is effectively treated as a degraded frame. In practice, the signals output from the decoder and from the PLC module could be overlap added (OLA) to ensure a smooth transition from a replacement frame output from the PLC module to a good frame output from the decoder. FIG. 8 shows a schematic illustration of the output signals from the decoder and from a PLC module in accordance with this method. It is apparent from this figure that the duration of the PLC output is extended beyond the duration of a degraded frame and ideally is equal to the sum of the length of the degraded frame and the affected portion of the non-degraded frame, but it could be longer or shorter if it is not possible to determine the exact number of samples of the non-degraded frame that are adversely affected by the internal state of the decoder.

Figure 9:
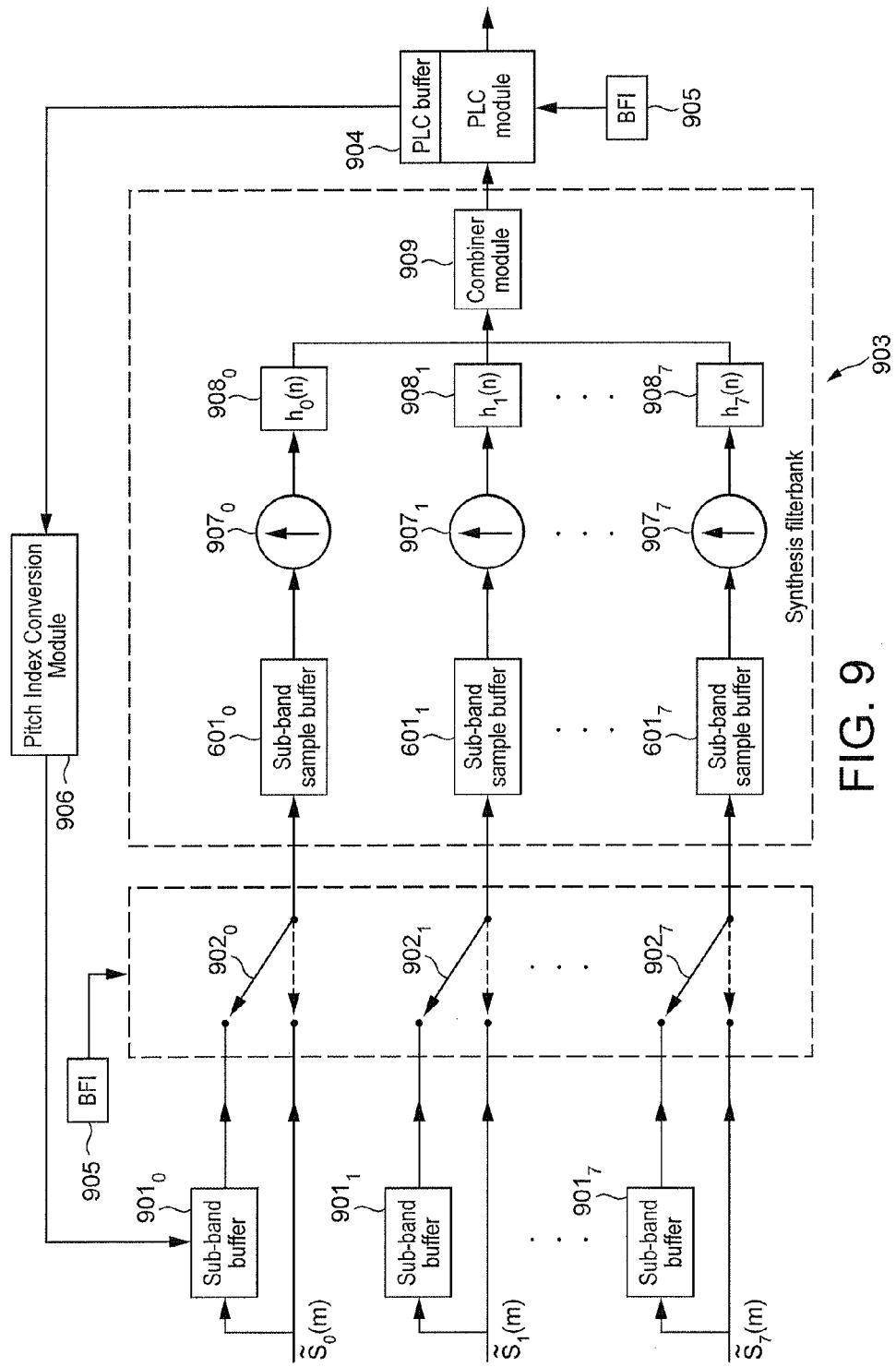
FIG. 9 is a schematic diagram of an apparatus for updating the memory state of the decoder following the receipt of a degraded frame.

An alternative method to account for the decoder being in the incorrect internal state following the receipt of a degraded frame is to update the state of the decoder. Suitably, this may be done by inputting data into the decoder following the receipt of a degraded frame. A schematic diagram of apparatus that can be used to update the state of the decoder in this manner is shown in FIG. 9. The apparatus in FIG. 9 comprises: sub-band buffers $901_M$, where M=0, 1, . . . N−1 for N sub-bands, switches $902_M$, a synthesis filterbank 903, a packet loss concealment (PLC) module 904, a bad frame indicator 905 and a pitch period conversion module 906. The synthesis filterbank comprises upsamplers $907_M$, filters $908_M$, where each filter is denoted by $h_M(n)$ and a combiner module 909 It further contains sub-band sample buffers $601_M$, where each sub-band sample buffer works in the same manner as the sample buffer 601 described with reference to FIGS. 6A-C. The synthesis filterbank shown in FIG. 9 operates in the same manner as the synthesis filterbank described with reference to FIG. 5. In the apparatus shown in FIG. 9, there are suitably 8 sub-bands. This is for illustrative purposes only, and the number of sub-bands could suitably be either 4 or 8 if SBC is used or any other suitable value if a different coding scheme is adopted.

The apparatus shown in FIG. 9 acts to update the memory of the synthesis filterbank following the receipt of a degraded frame. The sub-band buffers receive de-quantized received decoded samples $\tilde{S}_M(m)$. The BFI module determines whether a received frame is degraded. The BFI could be generated by, for example, a hardware module using cyclic redundancy code (CRC). The BFI module determines the position of the switches $902_M$; if the BFI module determines that a received frame is degraded, the switches $902_M$ are positioned in the 'up' position as shown by the solid line in FIG. 9. The BFI module also inputs a signal into the PLC module upon the receipt of a bad frame. The PLC module will generate replacement data corresponding to the degraded frame and output the data as a wide-band signal $\tilde{x}(n)$. The PLC module could employ a PLC algorithm such as, for example, pitch-based waveform substitution. With this example algorithm, the PLC module operates to store in a PLC buffer synthesised wide-band signals generated by the synthesis filterbank that correspond to non-degraded frames. Upon the receipt of a bad frame, the PLC module estimates the pitch period of the degraded frame and uses this to select data from the buffer as replacement data. For example, if the pitch period of a degraded frame is estimated to be P bits, then the data that is P bits from the end of the PLC buffer is selected as the replacement data. Different methods can be used to select the replacement data from the buffer in dependence on the pitch period depending on the specific form of waveform substitution being used.

The PLC module determines the replacement data for a degraded portion of the wide-band signal by determining the pitch period of the degraded frame. The PLC module determines the pitch period in the full-band domain, that is, the data stored in the PLC buffer that is selected as replacement data is wide-band data formed from the synthesis filter bank. The selected data is output from the PLC module as replacement data for the degraded portion. The wide-band pitch period of the degraded frame is output from the PLC module into the pitch index conversion module (PIC) 906. The PIC module maps the pitch period in the wide-band domain onto the sub-band domain. The sub-band pitch periods are input into the sub-band buffers $901_M$, where each sub-band pitch period is used to select data from its respective sub-band buffer. The PIC module maps the wide-band pitch period P onto the set of sub-band pitch periods $p_M$, where M=0, 1, ... N−1 for N sub-bands. Each sub-band pitch period $p_M$ is input into its respective sub-band buffer $901_M$. Data is selected from each sub-band buffer $901_M$ in dependence upon the sub-band pitch period. For example, the first sub-band has sub-band pitch period $p_0$. Data from the sub-band buffer $901_0$ could be selected that is $p_0$ bits from the end of the buffer. Data is selected for each of the sub-bands and input into the respective synthesis filterbank sub-band sample buffer $601_M$ to update the memory of the filterbank following the receipt of a bad frame.

The PIC module may be configured to generate the sub-band pitch periods in dependence on the sampling rate difference between the sub-band and wide-band. Typically, the sub-band sampling rate is less than the wide-band sampling rate. In the case of SBC systems, the sub-band sampling rate is reduced by a factor of N compared to the wide-band sampling rate, where N is the number of sub-bands. A pitch period will therefore be represented by less samples in the sub-band compared to the wide-band and so the PIC module needs to take account of this difference when generating the sub-band pitch periods. The PIC module may also be configured to generate the sub-band pitch periods in dependence on the delay introduced by the synthesis filterbank. This delay arises because the sub-band signals take a finite amount of time to pass through the synthesis filterbank. This has the effect that if a set of sub-band samples $\tilde{S}_M(m)$ corresponding to a degraded frame are input into the sub-band buffers at a time m, the PLC module will not calculate the pitch period of the degraded frame until a finite amount of time later. The set of sub-band samples $\tilde{S}_M$ will be located at different positions within the respective sub-band buffer at this later time compared to when they were input to the buffers at time m. It is therefore important to take into account the different positions of the samples within the buffer when determining the sub-band pitch period.

If the BFI determines that a received frame is not degraded, the switches are positioned in the 'down' position, as shown by the dotted line in FIG. 9. In this case the received decoded sub-band samples $\tilde{S}_M(m)$ are input directly into the synthesis filterbank. The filterbank generates a wide-band signal $\tilde{x}(n)$ from the sub-band samples and inputs the signal into the PLC buffer. The generated wide-band signal is output as the decoded signal.

Systems are known in the prior art in which PLC is performed in each sub-band, however it is difficult to perform pitch estimation on the higher frequency sub-bands. This means that PLC techniques that utilise the pitch of the degraded frame are not guaranteed to work on the higher frequency sub-bands. The example system shown in FIG. 9 operates by performing a PLC algorithm in the wide-band domain only. This advantageously allows for PLC to be performed on frames containing high frequency components. Furthermore, the system shown in FIG. 9 provides a method of updating the memory state of a decoder without having to re-encode data or re-generate sub-band signals from wide-band signals. Instead, data used to update the state of the decoder is selected from a sub-band buffer that stores sub-band data as it is received. By selecting previously stored data, the memory state of a decoder can be updated with a lower computational complexity than systems in which decoded data has to be re-encoded. The low computational complexity of the apparatus and methods disclosed in FIG. 6A to FIG. 9 makes them suitable for implementation on hardware where computational resources are limited and power consumption is a major concern, for example Bluetooth devices.

Figure 10:
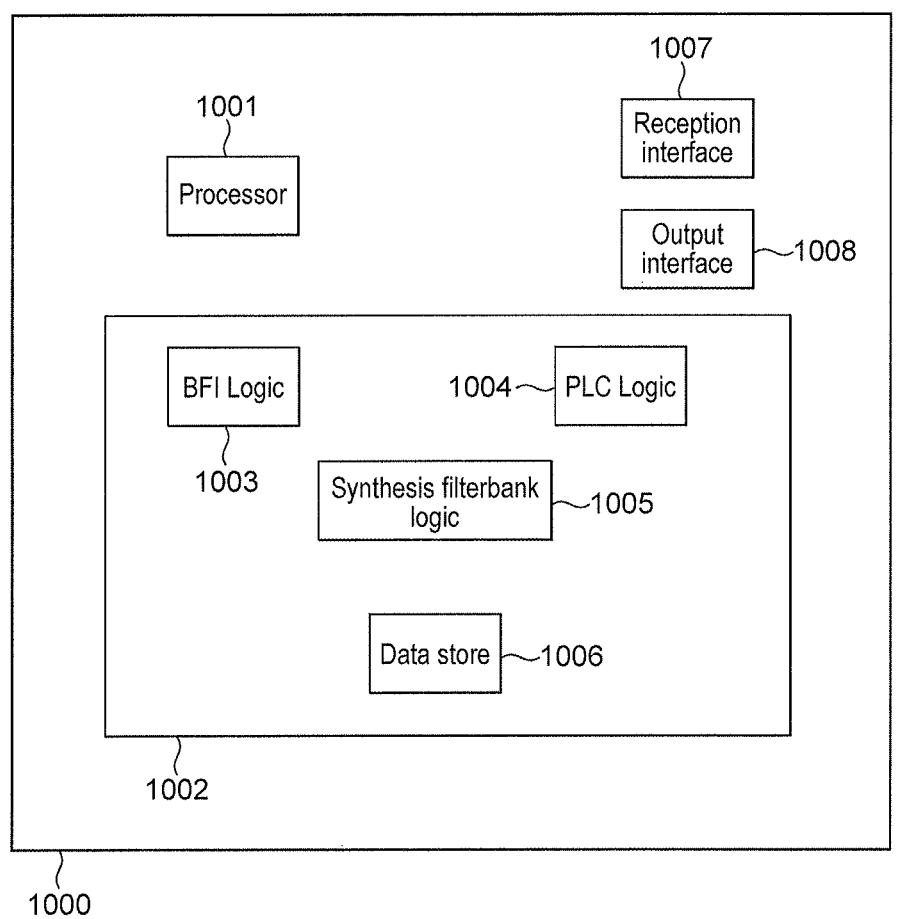
FIG. 10 is a schematic diagram of an exemplary computing based device in which the decoder update apparatus of FIG. 9 could be implemented.

FIG. 10 illustrates a computing based device 1000 in which the described apparatus for updating the state of a decoder can be implemented. The computing based device may be a wireless telecommunications device, for example a Bluetooth enabled device. The computing based device illustrates functionality used for detecting a degraded frame, performing a PLC algorithm, mapping the pitch period of the degraded frame into the sub-band domain and synthesising a wide-band signal from sub-band signals.

Computing based device 1000 comprises a processor 1001 for processing computer executable instructions configured to control the operation of the device in order to perform the decoder memory update method described with reference to FIGS. 6A to 8. The computer executable instructions can be provided using any computer-readable media such as memory 1002. Further software that can be provided at the computer-based device 1000 includes bad frame indicator logic 1003 which implements the step of determining if a received frame is degraded, and packet loss concealment logic 1004 that implements the step of determining replacement data for a degraded frame. Yet another piece of software that can be provided at the computer-based device 1000 is synthesis filterbank logic 1005 which implements the step of generating a wide-band signal from a plurality of sub-band signals. Alternatively, the bad frame indicator, packet loss concealment module and synthesis filterbank can be implemented partially or wholly in hardware. Data store 1006 stores data such as the replacement data for a degraded frame or the generate wide-band signal. Computing based device further comprises a reception interface 1007 for receiving data. Computing based device also comprises an output interface 1008.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method of replacing data in a receiver that decodes a wide-band signal including a plurality of sub-band signals, comprising:
   receiving, in the receiver, a plurality of frames of the wide-band signal including the plurality of sub-band signals;
   storing samples of each of the plurality of sub-band signals in a respective buffer of a decoder;
   determining, by the receiver, that one of the received plurality of frames is degraded;
   responsive to determining that one of the received plurality of frames is degraded, generating, in a packet loss concealment module of the receiver, a replacement frame for the degraded one of the received plurality of frames;
   determining, by the receiver, whether a next frame received after the degraded one of the received plurality of frames is degraded;
   in response to determining that the next frame is not degraded, determining that the next frame is a first non-degraded frame in the received plurality of frames received after the degraded frame;
   selecting for replacement, by the receiver, a number of the stored samples of the plurality of sub-band signals in the first non-degraded frame, wherein the number of the stored samples selected for replacement is equal to a maximum number of samples of the first non-degraded frame stored in the decoder with at least one sample of the degraded frame;
   generating, by the packet loss concealment module, a replacement portion for the selected number of the stored samples of the plurality of sub-band signals in the first non-degraded frame;
   outputting a signal corresponding to the replacement frame and the replacement portion from the packet loss concealment modules; and
   outputting a decoded signal corresponding to an unaffected sub-portion of the first non-degraded frame from the decoder; synthesizing the wide-band signal into at least one of audio and video from the outputted decoded signal.

2. The method according to claim 1, wherein the decoder comprises a synthesis filter bank.

3. The method according to claim 2, wherein the synthesis filter bank comprises a plurality of buffers equal to the number of sub-band signals.

4. The method according to claim 1, wherein a portion of the wide-band signal is a frame.

5. The method according to claim 1, wherein a portion of the wide-band signal is a packet.

6. The method according to claim 1, wherein the wide-band signal is encoded by sub-band coding (SBC), and wherein the decoder decodes the wide-band signal encoded by SBC.

7. The method according to claim 6, wherein a number of the sub-bands is equal to 8.

8. The method according to claim 6, wherein a number of the sub-bands is equal to 4.

9. A computing device for performing packet-loss concealment in a digital communication, wherein the computing device comprises a processor configured with processor-executable instructions to perform operations comprising:
   receiving a data stream comprising a plurality of frames of a wide-band signal including a plurality of sub-band signals;
   storing samples of each of the plurality of sub-band signals in a respective buffer of a decoder of the computing device;
   determining that one of the plurality of frames in the received data stream is degraded;
   responsive to determining that one of the plurality of frames in the received data stream is degraded generating a replacement frame for the degraded one of the plurality of frames;
   determining whether a next frame after the degraded one of the plurality of frames in the received data stream is degraded;
   in response to determining that the next frame is not degraded, determining that the next frame is a first non-degraded frame in the data stream after the degraded frame;
   selecting for replacement a number of the stored samples of the plurality of sub-band signals in the first non-degraded frame, wherein the number of the stored samples selected for replacement is equal to a maximum number of samples of the first non-degraded frame stored in the decoder with at least one sample of the degraded frame;
   generating a replacement portion for the selected number of stored samples of each of the plurality of sub-band signals in the first non-degraded frame;
   outputting a signal corresponding to the replacement frame and the replacement portion from a packet loss concealment module; and
   outputting a decoded signal corresponding to an unaffected sub-portion of the first non-degraded frame from the decoder; synthesizing the wide-band signal into at least one of audio and video from the outputted decoded signal.

10. The computing device according to claim 9, wherein the processor is configured with processor-executable instructions such that generating the replacement frame comprises generating the replacement frame using pitch-based waveform substitution.

11. The computing device according to claim 9, wherein the data stream comprises packet data.

12. The computing device according to claim 9, wherein a portion of the data stream comprises a plurality of samples, and a damaged portion of the data stream comprises at least one degraded sample.

13. The computing device according to claim 9, wherein the data stream comprises data that has been encoded by sub-band coding (SBC).

14. The computing device according to claim 9, wherein the processor is configured with processor-executable instructions to perform operations such that generating the replacement frame and generating the replacement portion comprise overlap adding (OLA) at least one of the replacement frame and the replacement portion to the decoded signal corresponding to an unaffected sub-portion of the first non-degraded frame.

15. The computing device according to claim 9, wherein the processor is configured with processor-executable instructions to perform operations such that generating the replacement frame and generating the replacement portion comprise generating the replacement frame and generating the replacement portion from previous portions of the received data stream.

* * * * *